(12) United States Patent  (10) Patent No.: US 8,382,448 B2
Fries et al.  (45) Date of Patent: Feb. 26, 2013

(54) COMPRESSED AIR SUPPLY SYSTEM FOR A UTILITY VEHICLE HAVING A PULSE-WIDTH MODULATED VALVE

(75) Inventors: Ansgar Fries, Munich (DE); Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 988 days.

(21) Appl. No.: 12/273,388

(22) Filed: Nov. 18, 2008

(65) Prior Publication Data
US 2009/0285696 A1 Nov. 19, 2009

Related U.S. Application Data

(63) Continuation of application No. PCT/EP2007/004419, filed on May 16, 2007.

(30) Foreign Application Priority Data

May 19, 2006 (DE) .......................... 10 2006 023 606

(51) Int. Cl.
*F04B 49/02* (2006.01)
*F16K 31/02* (2006.01)
(52) U.S. Cl. ..................... 417/223; 251/129.05; 417/53; 303/10
(58) Field of Classification Search ............ 417/18, 417/22, 32, 42, 212, 223, 53; 251/129.04, 251/129.05; 303/3, 10, 11
See application file for complete search history.

(56) References Cited

U.S. PATENT DOCUMENTS

| | | | | |
|---|---|---|---|---|
| 5,114,315 A * | 5/1992 | Kaltenthaler et al. | .......... | 417/18 |
| 5,639,224 A * | 6/1997 | Schlossarczyk et al. | ..... | 417/298 |
| 5,904,471 A * | 5/1999 | Woollenweber et al. | ..... | 417/371 |
| 6,089,831 A * | 7/2000 | Bruehmann et al. | .......... | 417/282 |
| 6,985,345 B2 * | 1/2006 | Hermann et al. | ............. | 361/139 |
| 8,172,339 B2 * | 5/2012 | Fries et al. | ....................... | 303/11 |
| 8,220,876 B2 * | 7/2012 | Detlefs et al. | ..................... | 303/3 |
| 2003/0052535 A1 | 3/2003 | Woerner et al. | | |

FOREIGN PATENT DOCUMENTS

| | | |
|---|---|---|
| DE | 32 33 545 A1 | 3/1984 |
| DE | 39 23 882 A1 | 9/1990 |
| DE | 195 15 895 A1 | 10/1996 |
| DE | 196 47 215 A1 | 7/1997 |
| EP | 1 508 488 A1 | 2/2005 |
| WO | WO 02/42136 A1 | 5/2002 |

OTHER PUBLICATIONS

International Search Report dated Aug. 27, 2007 with English translation (six (6) pages).

* cited by examiner

*Primary Examiner* — Charles Freay
*Assistant Examiner* — Nathan Zollinger
(74) *Attorney, Agent, or Firm* — Crowell & Moring LLP

(57) ABSTRACT

A compressed air supply system for a utility vehicle includes a compressor that can be driven by a drive by a pneumatic clutch, and a valve having a magnetic coil for selectively supplying compressed air to a coupling inlet of the clutch. When the valve is opened or maintained open, a pick-up current flows through the magnetic coil during a first phase, and a holding current weaker than the pick-up current flows through the magnetic coil during a second phase, a driver signal generating the holding current being pulse-width-modulated in the second phase.

20 Claims, 4 Drawing Sheets

COMPRESSED AIR SUPPLY SYSTEM FOR A UTILITY VEHICLE HAVING A PULSE-WIDTH MODULATED VALVE

CROSS-REFERENCE TO RELATED APPLICATIONS

This application is a continuation of PCT International Application No. PCT/EP2007/004419, filed May 16, 2007, which claims priority under 35 U.S.C. §119 to German Patent Application No. DE 10 2006 023 606.8, filed May 19, 2006, the entire disclosures of which are herein expressly incorporated by reference.

This application contains subject matter related to U.S. application Ser. No. 12/273,242, entitled "Method for Controlling or Regulating the Air Pressure in a Compressed Air Supply Device," now U.S. Pat. No. 7,802,425, Ser. No. 12/273,382, entitled "Compressed Air Supply System for a Utility Vehicle," now U.S. Pat. No. 8,172,339, and Ser. No. 12/273,255, entitled "Compressed Air Supply Device for a Utility Vehicle," now U.S. Pat. No. 7,886,532, all filed on an even date herewith.

BACKGROUND AND SUMMARY OF THE INVENTION

The present invention relates to a compressed air supply system for a utility or commercial vehicle, with a compressor drivable by a drive via a pneumatically switchable coupling, and with a valve having a magnet coil, for the selective supply of compressed air to a switch input of the coupling.

Compressed air supply systems are of central importance for utility vehicles. In particular, the brake system or a pneumatically braked utility vehicle requires compressed air, as do numerous further consumers, for example air suspensions or lift axle devices. The compressed air to be prepared and distributed by the compressed air supply system is delivered by a compressor which is generally driven by the internal combustion engine of the utility vehicle. In a concept which is common in this regard, the compressor is coupled to the internal combustion engine via a pneumatically switchable coupling, the compressed air for the pneumatic activation of the coupling being extracted, in turn, from the compressed air supply system. An example of a system of this type is given in DE 39 23 882 C2.

Owing to the switchability of the coupling, the operation of the compressor can be interrupted, as required, for example during the regeneration phases of the filter unit. The decoupling of the compressor from the internal combustion engine can likewise be used in a directed manner with regard to the energy balance of the utility vehicle.

However, implementing a concept with a switchable coupling is not without problems in all aspects. In particular, high temperatures prevail in the region of the internal combustion engine, so that the switching members, that is to say, in particular, pneumatically and/or electrically activatable valves, have to be designed correspondingly, thus entailing correspondingly high costs.

The object on which the invention is based is to make available a compressed air supply system with an electrically switchable coupling on the basis of a cost-effective and particularly functionable concept.

The invention builds on the generic compressed air supply system in that, when the valve is being opened or kept open, a pick-up current flows in the magnet coil during a first phase, and, during a second phase, a holding current flows which is lower than the pick-up current a driver signal which causes the holding current being pulse-width-modulated in the second phase. Thus, the power consumption of the magnet coil can be lowered in a controlled way, so that the high temperatures prevailing in the region of the internal combustion engine can be tolerated more effectively. The amplitude of the pulse-width-modulated holding current may be lower than the value of the pick-up current, and, by means of pulse-width modulation, for example with a duty factor of 50%, a further lowering of the heat output emitted by the coil occurs. The pick-up current flows for a period of time of, for example, 50 ms. The duty factor during the pulse-width-modulated holding current phase is, for example, 0.8 to 4 kHz.

The invention is advantageously developed in that, in a third phase, an intermediate current flows which is higher than the holding current. The intermediate current serves for ensuring the open state of the valve. If a lowering of the magnet armature in the direction of its position corresponding to the closed valve position occurs in the holding current phase, then, by means of a suitable intermediate current pulse, the armature can be brought again into a position corresponding to the fully open position. The intermediate current may, for example, have the same value as the pick-up current, and the pulse length may likewise amount, for example, to 50 ms.

Provision can furthermore be made for the valve to be arranged in the region of a fresh air supply to the compressor. In the region of the air supply to the compressor, that is to say, in particular, at the intake connection piece of the latter, comparatively low temperatures prevail, so that a valve can be used, without special account being taken of temperature resistance. In addition, the arrangement mentioned affords the advantage that a particularly short line path may be provided between the valve and the switchable coupling, thus shortening the changeover times of the coupling. This is advantageous particularly in plants which are intended to bring about a frequent changeover of the coupling.

In this respect, there may usefully be provision for the valve to be fastened directly to a housing of the coupling. By the valve being flanged directly on the coupling housing, any line between the valve and the coupling may be dispensed with. A line break is thereby ruled out, and, furthermore, short switching times for the coupling can be ensured.

Furthermore, in terms of the temperature conditions, it is advantageous that the valve is arranged in the region of an air stream which can be generated by the ventilation of the internal combustion engine. The valve is thus additionally cooled. In particular, utilizing the vehicle electronics, the ventilation of the internal combustion engine can be switched on, even if the temperature of the internal combustion engine would not require this. The ventilation then serves mainly for cooling the valve. Further measures which lower the temperature of the magnet coil are good heat transmission from the magnet coil to the valve housing, a cooling duct which runs through the valve and, in particular, may carry intake air of the compressor, and/or cooling ribs on the valve housing.

There is usefully provision for the valve to be an electrically pilot-controllable pneumatic valve. Such a valve, because of the high air throughput achievable, makes it possible to have a rapid pressure build-up at the switching member of the coupling, so that this measure, too, increases the switching speed. Moreover, in comparison with a valve directly controlled electrically, a lower electrical power is required at the same switching capacity.

The compressed air supply system according to the invention may be designed, for example, such that the opening of the valve is caused by an electrical signal from a pressure switch which responds to a pressure in a compressed air preparation plant. One reason for decoupling the internal combustion engine and compressor may be the presence of a sufficient pressure within the compressed air preparation plant or in the region of the consumer connections. It is consequently useful to convert this pressure into an electrical signal which then, in turn, causes the decoupling of the internal combustion engine and compressor. By means of further electrical or electronic components, the driver signal for activating the magnet coil is generated on the basis of the signal generated by the pressure switch.

It is useful, in this connection, that the driver signal is made available by an electronic control which receives pressure-dependent input signals. The signal from the pressure switch is thus first delivered to an electronic control which then, if appropriate, outputs the signal for the valve. The advantage of this is that other parameters present in the utility vehicle can be taken into account in terms of the operation of changing over the coupling.

For example, there may be provision for the electrical driver signal to be made available by an electronic control which receives temperature-dependent input signals. Thus, for example, the temperature in the region of the compressor can be measured, in order, in the case of an increased temperature, to bring about a decoupling of the compressor from the internal combustion engine.

It is likewise possible for the electrical driver signal to be made available by an electronic control which receives input signals dependent on the input-side and/or output-side rotational speed of the coupling. A monitoring of the rotational speeds in the region of the coupling may also be useful, for example with a view to fault diagnosis.

According to a particularly advantageous embodiment of the invention, there is provision for the electronic control to be integrated into a compressed air preparation plant. This can be implemented, in practice, in that the conventional electronic control of the compressed air preparation plant is extended to include the functionality of coupling activation.

It is also conceivable, however, that the electronic control communicates via an interface with a control integrated into a compressed air preparation plant. On this basis, the conventional electronic control of the compressed air preparation plant can remain largely unchanged, and the switching functionality for the coupling can be available externally.

According to a particularly advantageous embodiment of the invention, there is provision for the compressed air delivered to the switch input via the valve to be extracted from a compressed air preparation plant via a nonreturn valve. In order to ensure a high switching speed in the case of a pneumatic valve, delivery to a pneumatic valve must preferably be maintained at a certain pressure level. Consequently, during the opening of the valve, a sufficient pressure is immediately present which can then also quickly cause the changeover of the coupling via the short line to the coupling. Since the compressed air for changing over the coupling is preferably extracted from a compressed air preparation plant which also supplies other consumers with compressed air, a pressure level, sufficient during the ventilating operation, in the line leading to the pneumatic valve is often ensured by an additional pressure reservoir. This is unnecessary if the compressed air delivered to the switch input via the valve is extracted via a nonreturn valve, since the latter prevents a pressure breakdown in the pressure delivery line on account of other effects in the region of the compressed air preparation plant and the consumers connected to it.

According to a preferred embodiment, there may be provision for the nonreturn valve to be integrated into the compressed air preparation plant. An essential constituent of the compressed air preparation plant is a valve housing which has at least one circuit protection device and which makes it possible readily to incorporate a further nonreturn valve by dealing with a merely structural task. However, the external arrangement of the nonreturn valve may also likewise be envisaged.

The invention relates, furthermore, to a method for controlling a compressed air supply system according to the invention and to a utility vehicle having a compressed air supply system according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the drawings, the same reference symbols designate identical or comparable components.

Figure 1:
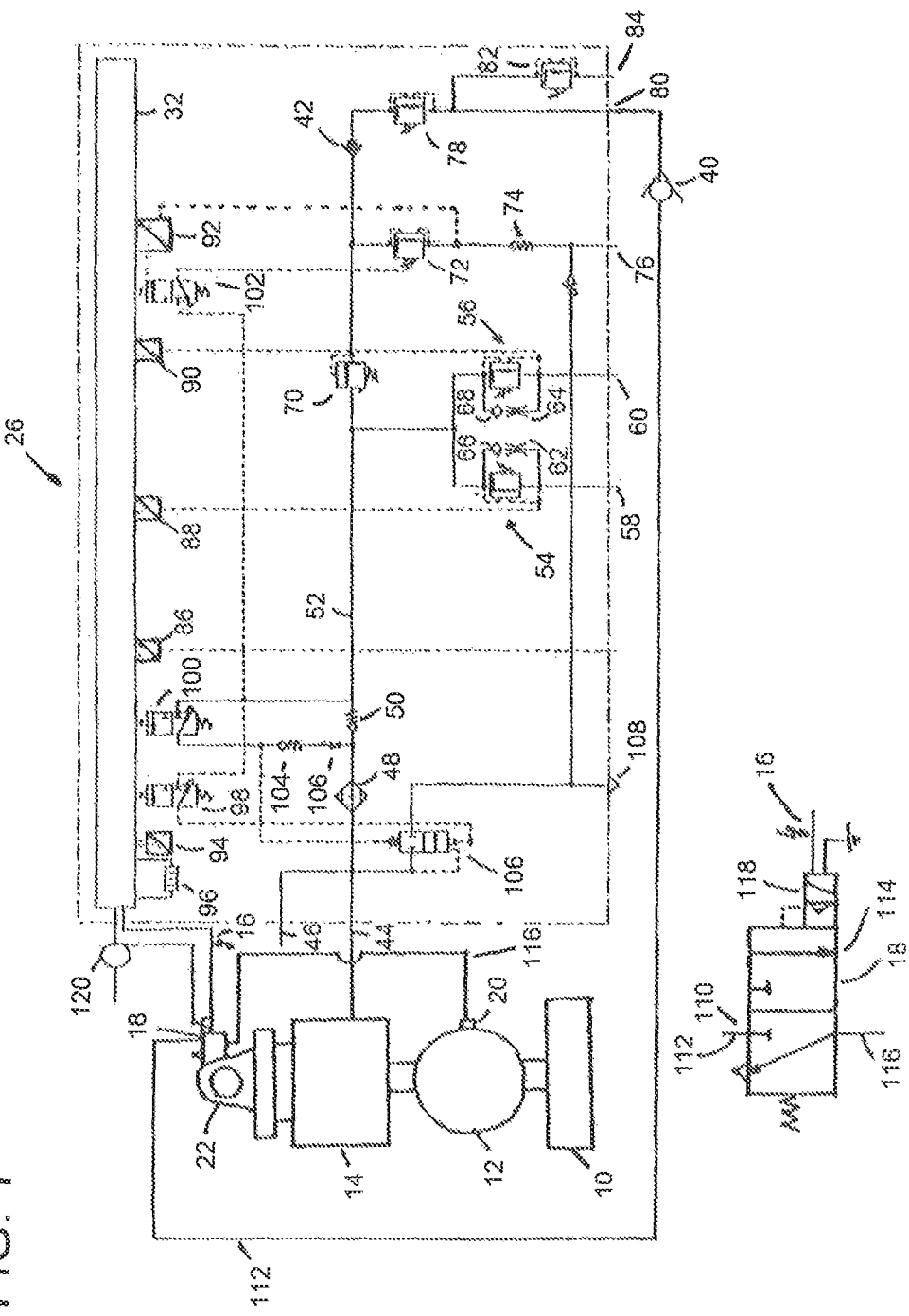
FIG. 1 shows a diagrammatic illustration of a compressed air supply system according to the invention.

FIG. 1 shows a diagrammatic illustration of a compressed air supply system according to the invention. A compressed air preparation plant 26 is illustrated. By means of this, delivered compressed air is filtered and distributed to various compressed air consumers. An input connection 44 is provided, which is connected to a compressor 14 provided outside the compressed air preparation plant 26. An extraneous filling connection 46 is arranged parallel to the input connection 44. The compressed air delivered to one of the inputs 44, 46 is delivered to a filter unit 48 and from there, via a nonreturn valve 50, to a main supply line 52. Arranged in parallel on the main supply line 52 are two overflow valves 54, 56, via which connections 58, 60 for service brake circuits of the utility vehicle, are supplied with compressed air. A throttle 62, 64 and a nonreturn valve 66, 68 are arranged in each case parallel to the overflow valves, according to the present embodiment a flow parallel to the flow through the overflow valves 54, 56 being made possible from the main supply line 52 to the connections 58, 60 of the service brake circuits. As a result, particularly during the refilling of the system, an early filling of the service brake circuit reservoirs can take place even when the pressures in the main supply line 52 are low. It is likewise possible to provide the nonreturn valves in the opposite direction, this refilling benefit being dispensed with. As a result, an afterfilling of secondary consumers from the reservoirs of the service brake circuits is then made possible. Furthermore, a pressure limiter 70 is provided in the main supply line 52. Two further lines branch off in parallel on the pressure-limited side of the pressure limiter 70, a connection 76 for the parking brake and the trailer brake system being supplied by one line via an overflow valve 72 and a nonreturn valve 74. The other line, via a nonreturn valve 42 and an overflow valve 78, supplies a connection 80 which is provided for actuating the compressor coupling 12. The overflow valve 78 is followed in a branching-off line by a further overflow valve 82, via which a further secondary consumer connection 84 is supplied.

A plurality of pressure sensors 86, 88, 90, 92 are connected to the electronic control 32, the pressure sensor 88 measuring the pressure at the service brake connection 58, the pressure sensor 90 measuring the pressure at the service brake connection 60 and the pressure sensor 62 measuring the pressure directly downstream of the overflow valve 72 for the connection 76 of the parking brake and trailer. Furthermore, a temperature sensor 94 and a heating 96 are connected to the electronic control 32. Moreover, three solenoid valves 98, 100, 102 are connected to the electronic control 32, the pressure controller solenoid valve 98, the regeneration solenoid valve 100 and a solenoid valve 102 for the additional pressure control of the overflow valve 72. The solenoid valves 78, 100, 102 are designed as 3/2-way valves and all are closed in the currentless state. In the closed state, the pressure of the main supply line 52 is present at the inputs of the solenoid valves 98, 100, 102. To initiate a regenerating operation, it is necessary to apply current to the regeneration solenoid valve 100 and the pressure controller solenoid valve 98 and thus transfer them into their state which is not illustrated. The result of this is that dry compressed air is extracted from the service brake reservoirs via the main supply line 52 and then, bypassing the nonreturn valve 50, flows in the opposite direction, via the regeneration solenoid valve 100, a further nonreturn valve 104 and a throttle 106, through the filter unit 48, in order then, via a discharge valve 106 changed over into its switching position, not illustrated, on account of the changeover of the pressure controller solenoid valve 98, to flow out to a discharge 108 and from there into the atmosphere. The compressor 14 already mentioned, an internal combustion engine 10 and a switchable coupling 12 connecting the compressor 14 to the internal combustion engine 10 are illustrated outside the compressed air preparation plant 26. The compressor 14 has an intake connection piece 22, via which the air to be compressed is sucked in. In the region of this air delivery, a 3/2-way valve 18 is arranged, which in the present case, as separately illustrated once again, is designed as an electrically pilot-controlled pneumatic valve. The pneumatic valve 18 has an input connection 110, to which a line 112 leading to the coupling connection 80 is connected. In this line 112, a nonreturn valve 40 is arranged which allows a flow from the coupling connection 80 to the valve 18 and prevents an opposite flow. The valve 18 has an output connection which is coupled to a switch input 20 of the coupling 12 via a line 116. Via an electrical input 118 for the purpose of delivering a signal 16, the valve is connected to the electronic control 32 of the compressed air preparation plant 26 and to ground which is picked off at a central plug 120.

The compressed air supply system according to FIG. 1 operates as follows in terms of the switchable coupling 12. When the coupling 12, closed in the non-pressure-activated state, is to be opened, for example in the case of a regeneration already mentioned, the electronic control 32 transmits an output signal 16 to the electrically pilot-controlled pneumatic valve 18. The valve 18 opens, and a connection is thereby made between the coupling connection 80 of the compressed air preparation plant 26 and the switch input 20 of the coupling 12. By means of the ventilation of the switch input 20, the coupling 12 is opened and the compressor 14 is stopped. The opening of the valve 18 required for this purpose takes place by means of a high pick-up current and a pulse-width-modulated holding current which is lowered with respect to the latter. During the holding current phase, intermediate pulses are supplied which bring a possibly lowered armature into its end position again. To close the coupling 12, the application of current to the electrical input 118 is discontinued again, so that the switch input 20 is vented. A short switching time is ensured by the nonreturn valves 40, 42. The nonreturn valve 42 prevents a backflow of compressed air out of the line 112 in the direction of the branches of the service brake connections 58, 60 and of the connection for the parking brake and the trailer. The nonreturn valve 40 additionally prevents a backflow out of the line 112 to the secondary consumer connection 84. Depending on the design of the plant and on the requirements in terms of the switching time, one of the nonreturn valves 40, 42 may be sufficient. The nonreturn valves 40, 42 thus ensure that a certain pressure level can always be maintained in the intact line 112, so that, during the changeover of the valve 18, a rapid pressure buildup at the switch input 20 of the compressor 12 is ensured. An additional reservoir in the region of the line 112, by means of which reservoir the maintaining of such a pressure level could likewise be ensured, is therefore unnecessary. Between the connection 80 and the nonreturn valve 40, further consumers may also be connected, for example exhaust gas purification, an engine brake and/or transmission activation.

Figure 2:
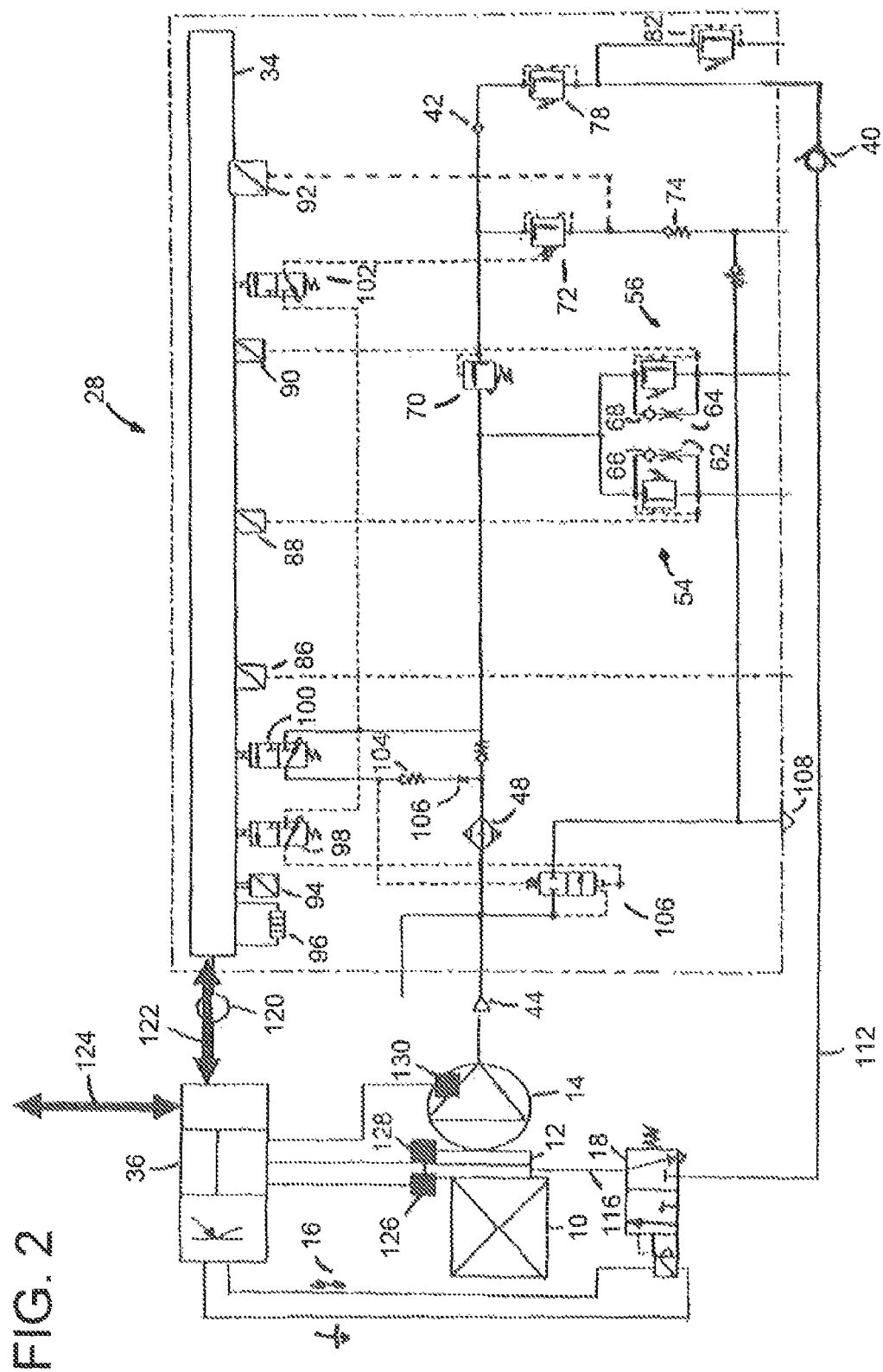
FIG. 2 shows a diagrammatic illustration of a compressed air supply system according to the invention.

FIG. 2 shows a diagrammatic illustration of a compressed air supply system according to the invention. Numerous properties of the embodiment according to FIG. 2 are identical to the embodiment according to FIG. 1, for example also the preferred arrangement of the electrically pilot-controlled pneumatic valve 18 in the region of the air inlet of the compressor 14, even though this is not illustrated here. In contrast to the embodiment according to FIG. 1, in the embodiment according to FIG. 2 an external control 36 is provided in addition to the electronic control 34 in the compressed air preparation plant 28. The external control 36 is suitable for communicating with the internal control 34 via an interface 122 which is preferably made available by the central plug 120. An interface 124 with other vehicle components is likewise provided, for example with a vehicle management computer via a CAN bus. The interfaces 122, 124 may be combined in structural terms. FIG. 2 shows, furthermore, that a rotational speed sensor 126 may be arranged on the input side of the coupling 12 and a further rotational speed sensor 128 may be arranged on the output side of the coupling 12. Moreover, a temperature sensor 130 is provided at the compressor 14. The signals from the sensors 126, 128, 130 are delivered to the external control 36 and are taken into account by the latter with regard to the activation of the valve or are utilized in another way, for example for function monitoring, and/or are transferred in original or processed form via the interfaces 122, 124.

The useful determination of the rotational speeds and of the temperature may also be provided in conjunction with the embodiment according to FIG. 1, even though this is not illustrated there. The corresponding data are then delivered to the internal control 32 of the compressed air preparation plant 26.

Figure 3:
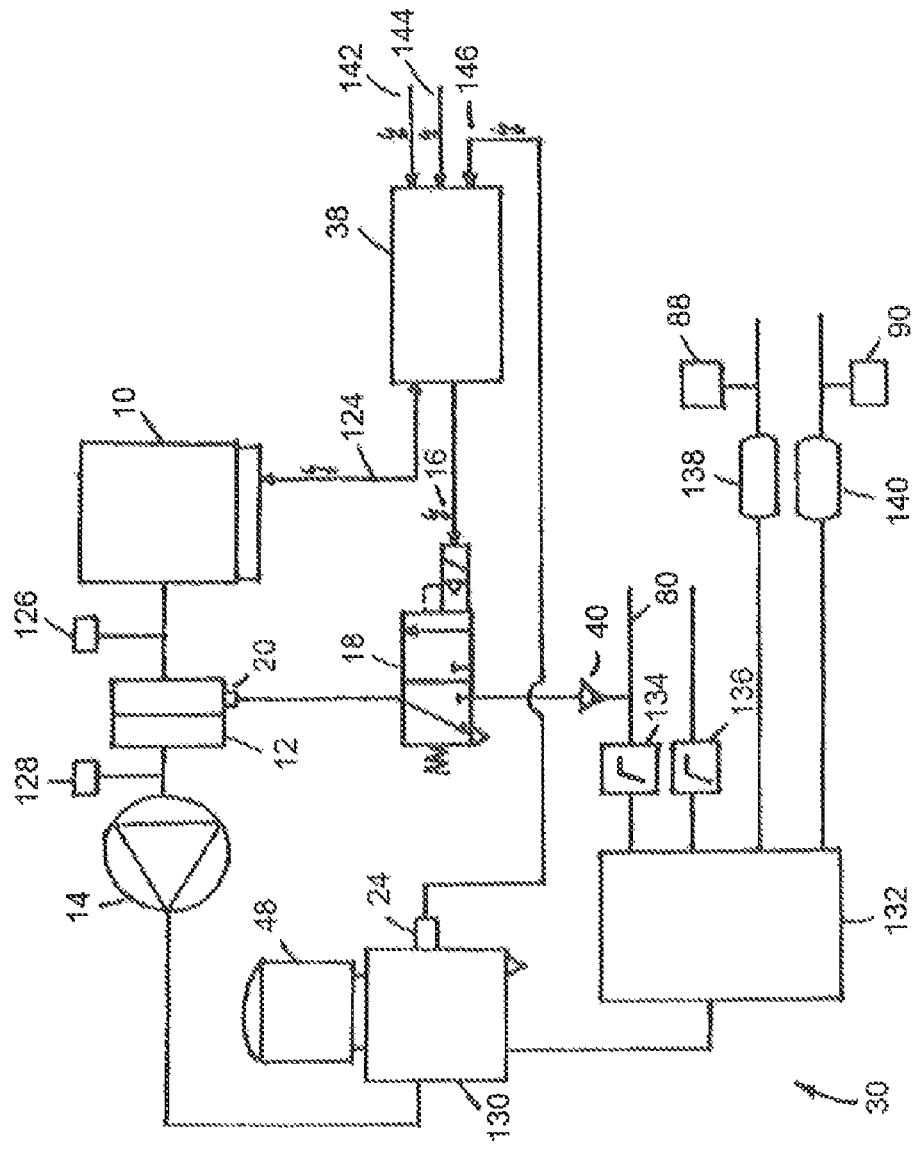
FIG. 3 shows a diagrammatic illustration of a compressed air supply system according to the invention.

FIG. 3 shows a diagrammatic illustration of a compressed air supply system according to the invention. The compressed air supply system illustrated here is illustrated in the form of a plurality of distributed individual subassemblies. In particular, a pressure controller 130 with an attached filter unit 48, a multiple-circuit protection valve 132, pressure limiters 134, 136 and an electronic control 38 are illustrated. The components may in reality be distributed in the way described. However, the distributed illustration may also be understood in the sense of a functional division, in reality the pressure controller, multiple-circuit protection valve, pressure limiters and/or electronic control being implemented in an integrated manner, for example as illustrated in connection with FIGS. 1 and 2.

In the embodiment according to FIG. 3, once again, a compressor 14 is coupled with an internal combustion engine 10 via a switchable coupling 12. The compressor 14 delivers compressed air to the pressure controller 130, from where the compressed air is transferred to the multiple-circuit protection valve 132. The multiple-circuit protection valve 132 distributes the compressed air to the reservoirs 138, 140 and other connections, one of which is illustrated as a connection provided with a pressure limiter 136. A further connection is the coupling connection 80, likewise supplied via a pressure limiter 134. Compressed air is delivered to the electrically pilot-controlled pneumatic valve 18 from the coupling connection 80 via the nonreturn valve 40 which ensures the switching times. The valve 18 is activated by means of the electronic control 38 which likewise communicates via the interface 124 with the internal combustion engine or with an engine control. The electronic control 38 has a plurality of inputs 142, 144, 146. The inputs 142, 144 symbolize the possibility of supplying the control 38 with temperature, pressure and/or rotational speed information, for example measured by the pressure sensors 88, 90 of the service brake circuits, and/or by the rotational speed sensors 126, 128 on the input side and the output side of the coupling 12. On the pressure controller 130, a pressure switch 24 is provided. This is connected to the input 146 of the electronic control 38. The electronic control 38 can thus be supplied with a pressure-dependent electrical signal.

The compressed air supply system according to FIG. 3 operates as follows. On the basis of the information made available via the inputs 142, 144, 146 and the interface 124, the electronic control 38 can deliver an electrical signal 16 to the valve 18, so that the latter changes over and opens the coupling 12 by virtue of the ventilation of the switch input 20. The decision to output the signal 16 can then take place on the basis that pressures, temperatures or rotational speeds measured by sensors make it necessary to open the coupling 12. In parallel with this, however, the opening of the coupling may also take place on the basis of the signal output by the pressure switch 24. If components of the embodiment illustrated in FIG. 3 experience a defect, so that, for example, the pressure levels in the service brake circuits are no longer measured reliably, an opening of the coupling 12 nevertheless takes place because of the presence of the pressure switch 24 and of the switch functionality thereby made possible, thus preventing destruction of said coupling due to the defects outlined.

Figure 4:
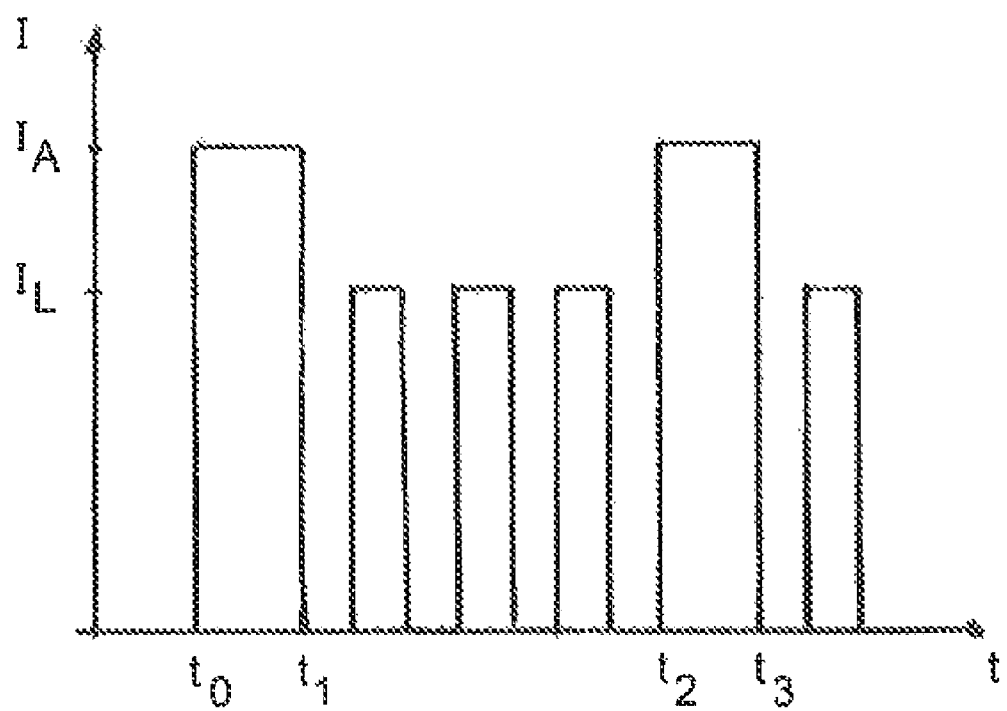
FIG. 4 shows a typical flow profile for opening or keeping open the valve activating the coupling.

FIG. 4 shows a typical flow profile for opening or keeping open the valve activating the coupling. In the graph, the current I flowing through the coil is plotted against the time t. At a time point to, the coil is opened by the provision of a pick-up pulse of current intensity $I_A$. From the time point $t_1$, the holding current phase can be entered, where individual current pulses with the amplitude $I_L$ and with a duty factor of 50%, illustrated here by way of example, are supplied. At a time point $t_2$, an intermediate pulse can be made available which, for example, results in turn in a current flow of $I_A$ through the magnet coil. The intermediate pulse is followed at the time point $t_3$ again by a pulse-width-modulated holding current phase. By means of pulse-width modulation, the current flow determined over time through the coil is once again lower than the holding current amplitude $I_L$. The duration of the pick-up pulse and of the intermediate pulses may, for example, lie in the region of 50 ms. The frequency of the pulse-width modulation lies, for example, in the range of 0.8 to 4 kHz. In addition to the lowering of the holding current which reduces the temperature in the region of the valve activating the coupling, further measures are available which are conducive to the temperature conditions. For example, the fan of the internal combustion engine may be switched on during the holding current phase. Furthermore, advantageous temperature effects may be achieved by the design of the valve itself and by the arrangement of the latter in the region of the compressor or of the coupling. For example, the magnet coil may be coupled in a thermally efficient way to the valve housing, the valve housing may be equipped with cooling ribs, the valve housing may have a cooling port through which preferably compressor intake air, that is to say often cooler fresh air, flows, and the valve may be arranged in the region of the intake connection piece of the compressor, so that fresh air flows around it on the outside.

TABLE OF REFERENCE SYMBOLS

10 Drive
12 Coupling
14 Compressor
16 Signal
18 Valve
20 Switch input
22 Fresh air supply
24 Pressure switch
26 Compressed air preparation plant
28 Compressed air preparation plant
30 Compressed air preparation plant
32 Electronic control
34 Electronic control
36 Electronic control
38 Electronic control
40 Nonreturn valve
42 Nonreturn valve
44 Input connection
46 Extraneous filling connection
48 Filter unit
50 Nonreturn valve
52 Main supply line
54 Overflow valve
56 Overflow valve
58 Connection service brake circuit
60 Connection service brake circuit
62 Throttle
64 Throttle
66 Nonreturn valve
68 Nonreturn valve
70 Pressure limiter
72 Overflow valve
74 Nonreturn valve
76 Connection parking brake/trailer
78 Overflow valve
80 Connection coupling
82 Overflow valve
84 Connection secondary consumer
86 Pressure sensor
88 Pressure sensor
90 Pressure sensor
92 Pressure sensor
94 Temperature sensor
96 Heating
98 Solenoid valve
100 Solenoid valve
102 Solenoid valve
104 Nonreturn valve
106 Discharge valve
108 Discharge
110 Input connection
112 Line 114 Output connection
116 Line
118 Electrical input
120 Central plug
122 Interface
124 Interface
126 Rotational speed sensor
128 Rotational speed sensor
130 Pressure controller
132 Multiple-circuit protection valve
134 Pressure limiter
136 Pressure limiter
138 Reservoir
140 Reservoir
142 Input
144 Input
146 Input The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed air supply system for a utility vehicle, comprising:
   a compressor drivable by a drive via a pneumatically switchable coupling; and
   a valve having a magnet coil for a selective supply of compressed air to a switch input of the coupling;
   wherein when the valve is being opened or kept open, a pick-up current flows in the magnet coil during a first phase, and, during a second phase, a holding current flows which is lower than the pick-up current, a driver signal which causes the holding current being pulse-width-modulated in the second phase; and
   wherein, when the valve is kept open in a third phase, an intermediate current flows which is higher than the holding current.

2. The compressed air supply system as claimed in claim 1, the valve is arranged in a region of a fresh air supply to the compressor.

3. The compressed air supply system as claimed in claim 1, wherein the valve is fastened directly to a housing of the coupling.

4. The compressed air supply system as claimed in claim 2, wherein the valve is fastened directly to a housing of the coupling.

5. The compressed air supply as claimed in claim 1, wherein the valve is arranged in a region of an air stream which can be generated by the ventilation of the drive, and wherein the drive is an internal combustion engine.

6. The compressed air supply as claimed in claim 2, wherein the valve is arranged in a region of an air stream which can be generated by the ventilation of the drive, and wherein the drive is an internal combustion engine.

7. The compressed air supply system as claimed in claim 1, wherein the valve is an electrically pilot-controllable pneumatic valve.

8. The compressed air supply system as claimed in claim 1, wherein the opening of the valve is caused by an electrical signal from a pressure switch which responds to a pressure in a compressed air preparation system.

9. The compressed air supply system as claimed in claim 1, wherein the driver signal is made available by an electronic control, which receives pressure-dependent input signals.

10. The compressed air supply system as claimed in claim 1, wherein the driver signal is made available by an electronic control, which receives temperature-dependent input signals.

11. The compressed air supply system as claimed in claim 9, wherein the driver signal is made available by the electronic control, which receives temperature-dependent input signals.

12. The compressed air supply system as claimed in claim 1, wherein the driver signal is made available by an electronic control, which receives input signals dependent on an input-side and/or an output-side rotational speed of the coupling.

13. The compressed air supply system as claimed in claim 9, wherein the electronic control is integrated into a compressed air preparation system.

14. The compressed air supply system as claimed in claim 10, wherein the electronic control is integrated into a compressed air preparation system.

15. The compressed air supply system as claimed in claim 12, wherein the electronic control is integrated into a compressed air preparation system.

16. The compressed air supply system as claimed in claim 9, wherein the electronic control communicates via an interface with a control integrated into a compressed air preparation system.

17. The compressed air supply system as claimed in claim 1, wherein compressed air delivered to the switch input via the valve is extracted from a compressed air preparation system via a nonreturn valve.

18. The compressed air supply system as claimed in claim 17, wherein the nonreturn valve is integrated into the compressed air preparation system.

19. A utility vehicle comprising:
   a compressed air supply system comprising:
   a compressor drivable by a drive via a pneumatically switchable coupling; and
   a valve having a magnet coil for a selective supply of compressed air to a switch input of the coupling;
   wherein, when the valve is being opened or kept open, a pick-up current flows in the magnet coil during a first phase, and, during a second phase, a holding current flows which is lower than the pick-up current, a driver signal which causes the holding current being pulse-width-modulated in the second phase; and
   wherein, when the valve is kept open in a third phase, an intermediate current flows which is higher than the holding current.

20. A method for controlling a compressed air supply system for a utility vehicle having a compressor drivable by a drive via a pneumatically switchable coupling and a valve having a magnet coil for selectively supplying compressed air to a switch input of the coupling, the method comprising the acts of:
   flowing a pick-up current in the magnet coil during a first phase when the valve is being opened or kept open;
   flowing a holding current during a second phase, the holding current being lower than the pick-up current;
   pulse-width-modulating a driver signal that causes the flow of the holding current during the second phase; and
   flowing an intermediate current which is higher than the holding current when the valve is kept open in a third phase.

* * * * *